United States Patent [19]
Thayer et al.

[11] Patent Number: 5,798,127
[45] Date of Patent: Aug. 25, 1998

[54] INJECTION MOLDING OF A TIRE COMPONENT

[75] Inventors: Ronda Renee Bayer Thayer. Barberton; Robert Leon Benedict. Tallmadge; Larry Edward Chlebina; Bernard Byron Jacobs, both of Akron; Thomas Andrew Laurich, Tallmadge; Walter George Macesich, Akron; Norbert Majerus, Akron; John Sylvester Rambacher, Akron; William Allen Rex, Mogadore; Timothy Michael Rooney, Munroe Falls; Mohammad Eghbal Sobhanie, Akron; Albert James Yovichin, North Canton; David Lowell Wolfe; Daniel Patrick Hentosz, both of Akron, all of Ohio

[73] Assignee: The Goodyear Tire & Rubber Company, Akron, Ohio

[21] Appl. No.: 528,980

[22] Filed: Sep. 15, 1995

[51] Int. Cl.⁶ ............................................. B29C 35/00
[52] U.S. Cl. ................................ 425/117; 425/543; 425/547; 425/588; 425/556
[58] Field of Search ............................. 425/543, 547, 425/554, 572, 588, 556, 117; 264/275, 328.3, 328.2

[56] References Cited

U.S. PATENT DOCUMENTS

| | | |
|---|---|---|
| 2,724,865 | 11/1955 | Mills et al. |
| 2,878,517 | 3/1959 | Kramer . |
| 3,165,785 | 1/1965 | Hehl . |
| 3,188,691 | 6/1965 | Stenger . |
| 3,218,209 | 11/1965 | Travers et al. ............... 156/123 |
| 3,245,115 | 4/1966 | Ecklund . |
| 3,319,297 | 5/1967 | Garvin et al. . |
| 3,810,728 | 5/1974 | Jacobs ........................ 425/244 |
| 3,819,312 | 6/1974 | Arpajian ..................... 425/242 |
| 3,825,457 | 7/1974 | Holroyd et al. ............. 156/147 |
| 3,888,393 | 6/1975 | Drori ............................ 222/229 |
| 4,006,053 | 2/1977 | Goodfellow ................. 156/394 |
| 4,057,447 | 11/1977 | Holroyd et al. ............. 156/125 |
| 4,076,565 | 2/1978 | Goodfellow ................. 156/125 |
| 4,152,388 | 5/1979 | Grawey et al. .............. 264/248 |
| 4,168,193 | 9/1979 | Brunet et al. ............... 156/131 |
| 4,197,068 | 4/1980 | Pizzorno ..................... 425/430 |
| 4,199,315 | 4/1980 | Gallizia et al. ............. 425/572 |
| 4,202,717 | 5/1980 | Seiberling . |
| 4,249,882 | 2/1981 | Koch et al. ................. 425/547 |
| 4,444,612 | 4/1984 | Fink ........................... 156/394.1 |
| 4,448,620 | 5/1984 | Fink ........................... 156/125 |
| 4,980,111 | 12/1990 | Majerus ..................... 284/219 |
| 5,017,127 | 5/1991 | Majerus et al. ............. 425/549 |
| 5,062,783 | 11/1991 | Majerus et al. ............. 425/115 |
| 5,262,115 | 11/1993 | Tomlinson ................... 264/265 |
| 5,427,519 | 6/1995 | Gellert ......................... 425/529 |

FOREIGN PATENT DOCUMENTS

| | | |
|---|---|---|
| 0552040 | 7/1993 | European Pat. Off. ...... H04R 7/20 |
| 1299586 | 6/1962 | France . |
| 2078544 | 5/1971 | France . |
| 58-177326 | 10/1983 | Japan . |
| 61-40129 | 2/1986 | Japan . |
| 02-69215 | 3/1990 | Japan . |
| 2-92606 | 4/1990 | Japan . |
| 7290514 | 7/1995 | Japan ........................ B29C 45/26 |
| 1130520 | 10/1968 | United Kingdom . |
| 1239838 | 7/1971 | United Kingdom . |
| 2007578 | 5/1979 | United Kingdom . |
| 2203488 | 1/1980 | United Kingdom . |

*Primary Examiner*—Mathieu D. Vargot
*Attorney, Agent, or Firm*—Frederick K. Lacher

[57] ABSTRACT

Molds for injection molding tire components have controlled temperature passages leading to a manifold surrounding each mold cavity. The manifold is positioned to minimize weld lines in the injected tire component. In addition, a narrow gate opening between the manifold and mold cavity provides an elevated temperature of the injected material for decreasing the curing time of the tire component in the mold. Blade members may support and position tire components such as bead apex assemblies in the mold. These tire components may be unloaded by an unloader ring in communication with a source of vacuum for pulling the tire component out of the mold.

18 Claims, 10 Drawing Sheets

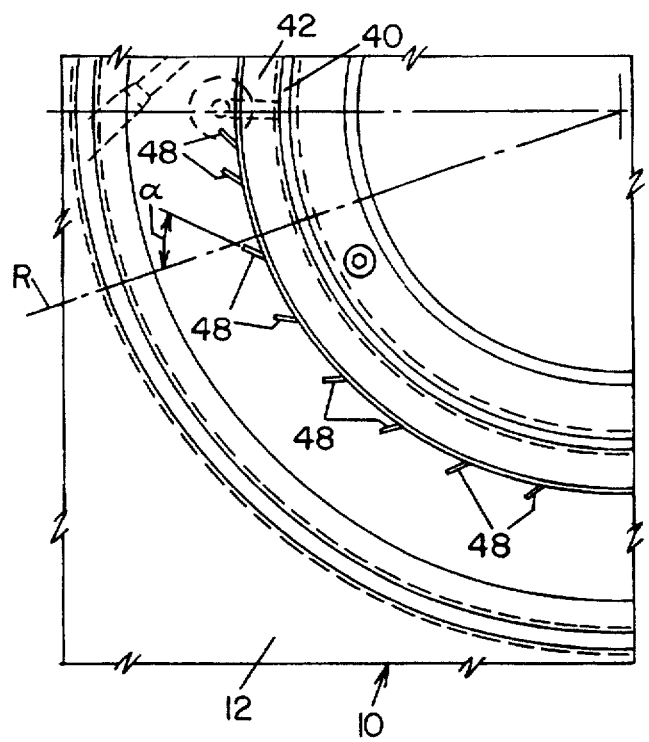
FIG. 2
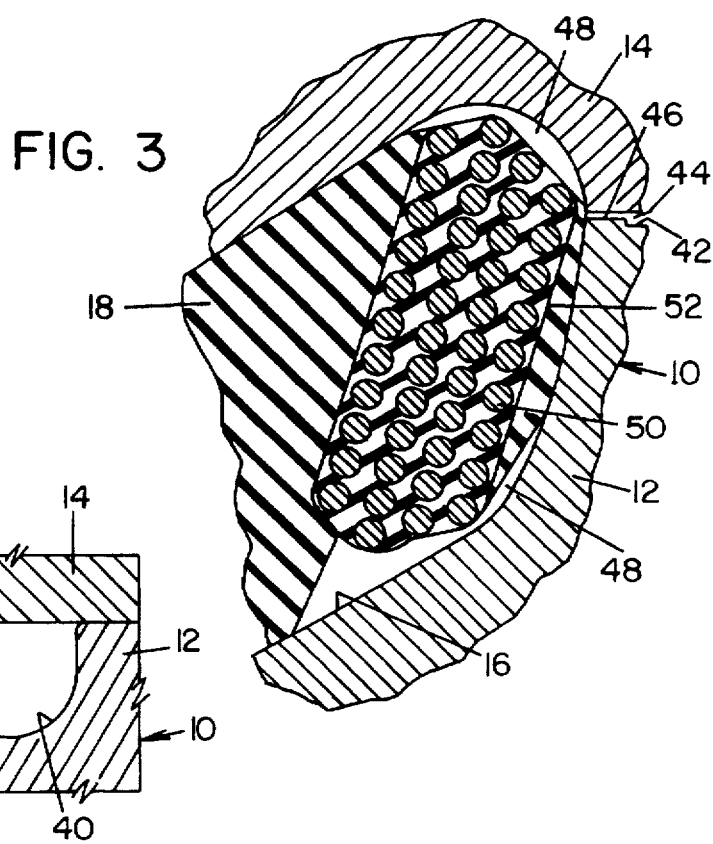
FIG. 3
FIG. 4

INJECTION MOLDING OF A TIRE COMPONENT

BACKGROUND OF THE INVENTION

Manufacturing automobile and truck tires requires the preassembly of certain tire components, assembling the components on a tire building machine and vulcanization of the assembled tire components in a tire press.

Two of the components which are made prior to assembly on the tire building machine are the tire bead apex assembly and the tire tread. These components which have been made of unvulcanized rubber are relatively thick and the extra time required to cure the rubber in them has increased the time required to cure the tire in the tire press. Also the uncured apex bead assembly may be distorted during building of the tire or during transportation of the tire to the tire vulcanizer. The unvulcanized tread is also subject to distortion during assembly and vulcanization.

It has been found that the uniformity of the cured tire can be improved and the cure time in the tire press can be reduced by building a tire with prevulcanized bead apex assemblies and/or a prevulcanized tread.

SUMMARY OF THE INVENTION

In accordance with this invention tire components such as bead apex assemblies and tire treads are injection molded providing semi-vulcanized tire components molded to precise dimensions and requiring no additional cure time in the tire press. This is accomplished by injecting an elastomeric material such as rubber into molds having the shape of the component in the finished tire. The time required for curing the injected rubber in the injection molding apparatus is reduced by increasing the temperature of the elastomeric material as it is injected through a narrow gate opening into the mold cavity. Temperatures of the elastomeric material before it reaches the mold are controlled by heating and cooling passages leading to a generally circular manifold adjacent the gate.

By injecting the elastomeric material into a manifold surrounded by the mold cavity, weld lines in the molded components can be avoided by locating the manifold so that some portions are closer to the mold cavity than others whereby the pressure at the mold cavity is equal at all points along the edge of the cavity.

The bead of the bead apex assembly may be supported by blade members in the surface of the mold which form slots in the assembly that are filled during the vulcanization of the tire.

The bead apex assembly may be removed from the mold with an unloading ring by communicating a vacuum to the ring to hold the bead apex assembly during removal.

In accordance with an aspect of the invention, there is provided a method of injection molding a circular tire component comprising:

(a) heating and mixing an elastomeric material;

(b) injecting the elastomeric material into a plurality of runners in a cold block of a mold assembly;

(c) controlling the temperature of the elastomeric material in the runners in the cold block;

(d) communicating the elastomeric material from the runners to a generally circular manifold in a heated mold having opposing mating surfaces;

(e) communicating the elastomeric material from the circular manifold through a landing area to a mold cavity and subjecting the material to shear and contact with the surface of the heated mold so as to increase the temperature of the material from 240° F. to 330° F. plus or minus 20° F. to accelerate the curing of the material;

(f) curing the elastomeric material for a period of time;

(g) opening the mold; and (h) removing the tire component from the mold.

In accordance with another aspect of the invention, there is provided an apparatus for injection molding a circular tire component of elastomeric material comprising:

(a) a mold assembly having a cold block and a heated mold mounted on the cold block;

(b) an injection apparatus for heating, mixing and injecting the elastomeric material into the mold assembly;

(c) a plurality of runners in the cold block for communicating the material from the injection apparatus to the mold;

(d) a generally circular manifold defined by opposing faces of the mold connected to the runners in the mold;

(e) a mold cavity radially outward of the manifold defined by the opposing faces of the mold and (f) a landing area between the manifold and the mold cavity defined by the opposing surfaces of the mold and having a narrow opening providing for heating and shearing the material as it is injected into the mold cavity to increase the temperature and decrease the curing time of the material.

BRIEF DESCRIPTION OF THE INVENTION

To acquaint persons skilled in the arts most closely related to the present invention, certain preferred embodiments thereof illustrating best modes now contemplated for putting the invention into practice are described herein by and with reference to the annexed drawings forming a part of the specification. The embodiments shown and described herein are illustrative and as will become apparent to those skilled in these arts, can be modified in numerous ways within the spirit and scope of the invention defined in the claims hereof.

In the annexed drawings:

FIG. 2 is a fragmentary plan view of the lower half of the mold shown in FIG. 1;

FIG. 3 is an enlarged fragmentary diagrammatic view of the mold shown in FIG. 1 illustrating the blades for supporting and positioning the bead;

FIG. 4 is an enlarged view in section like FIG. 1 showing the manifold, landing and injection passage into the mold cavity;

DETAILED DESCRIPTION OF THE INVENTION

Figure 1:
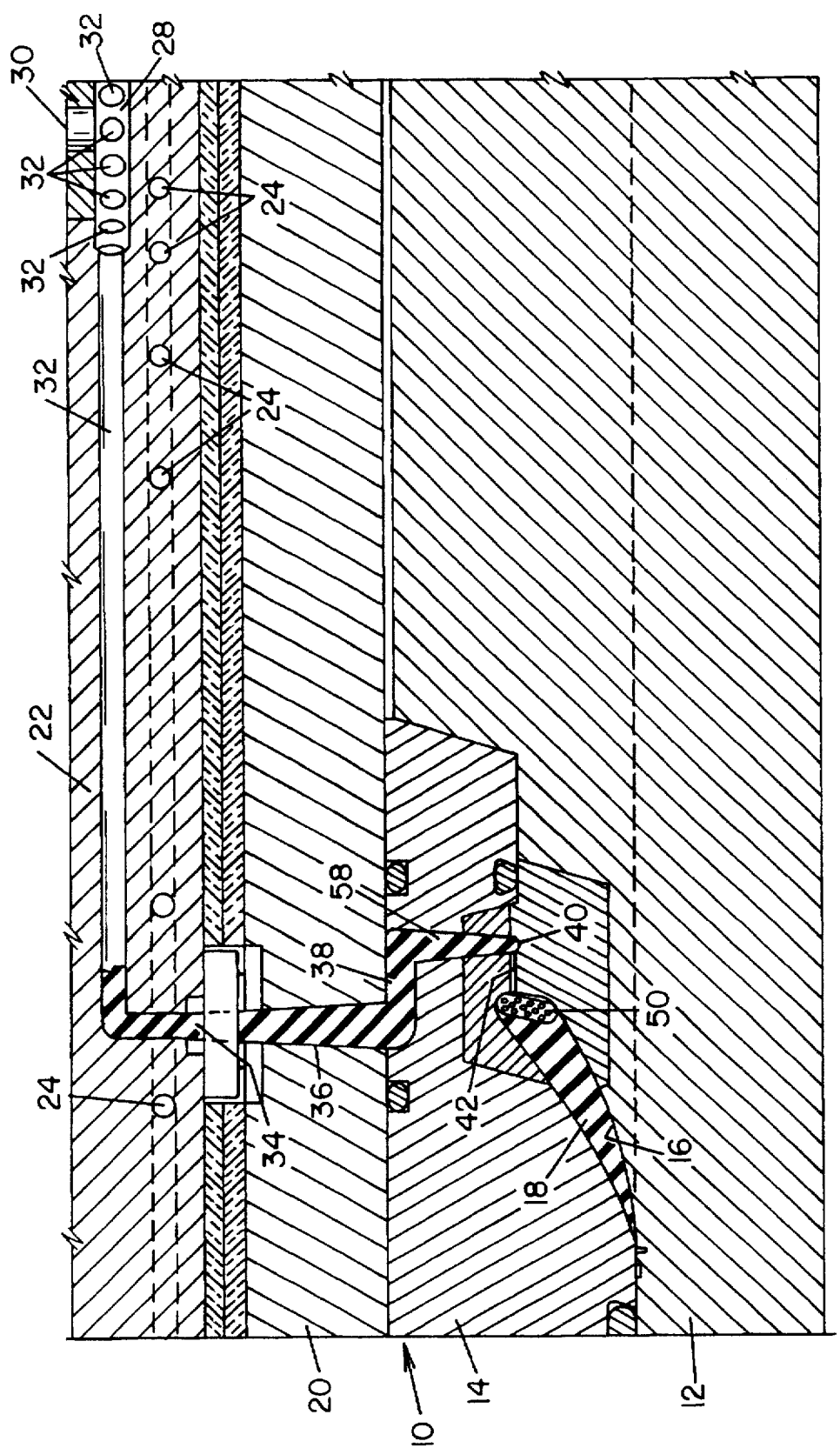
FIG. 1 is a fragmentary sectional view with parts being broken away of a cold block and single apex assembly mold embodying the invention.

Referring to FIGS. 1,2,3 and 4 a mold assembly 10 is shown having a heated lower mold half 12 and a heated upper mold half 14 providing a mold cavity 16 for injection molding a circular tire component such as a bead apex assembly 18.

The mold assembly 10 is mounted on a sprue plate 20 which is fastened to a cold block 22 having cooling passages 24. The cold block 22 may be mounted on an inlet block (not shown) for engagement with an injection molding apparatus and communicates an elastomer under pressure to a distribution block 28 through an inlet passage 30. Circumferentially spaced radially extending runners 32 communicate the elastomer under pressure from the distribution block 28 to nozzles 34 in engagement with circumferentially spaced sprues 36 in the sprue plate 20. The number of runners 32 may vary and in this embodiment there are six runners. Passages 38 in the upper mold half 14 are connected to the sprues 36 and communicate the elastomer under pressure to a generally circular manifold 40 in the lower mold half 12. An enlarged cross-section of the manifold 40 is shown in FIG. 4. Between the manifold 40 and the mold cavity 16 there is provided a circular landing area 42 on the lower mold half 12 which defines an injection passage 44 with the opposing faces of the upper mold half 14. The injection passage 44 extends radially outward into the mold cavity 16. A raised circular rib 46 is positioned on the landing area 42 for further restricting flow of the elastomer through the passage 44 and thereby increase the temperature of the material due to exposure to the heated surfaces of the upper mold half 14 and lower mold half 12 and due to the shearing of the material. This may increase the temperature of the material from 240° F. (115° C.) to 300° F. (165° C.) +−20° F. or (+−11° C.). The increased temperature increases rate of the curing of the elastomer which reduces the curing time the bead apex assembly 18 need be held in the mold assembly 10.

The elastomeric material is preferably cured for a predetermined length of time past the blow point of the material upon removal from the component from the mold. On the Rheometer scale this is around T-25.

Referring to FIGS. 2 and 3 circumferentially spaced support blades 48 are mounted on the lower mold half 12 and upper mold half 14 at the radially inner surface of the mold cavity 16 to support a bead bundle 50 as the mold assembly 10 is closed. The blades 48 support the bead bundle 50 at a position spaced from the surface of the mold cavity 16 so that when the elastomer is injected into the mold cavity the inner diameter 52 of the bead bundle is uniformly coated. A flipper normally used to separate the bead wires from the ply wires in a tire may also not be required. The rounded inside contour of the bead bundle 50 also allows the ply wires to move uniformly during shaping. In addition the support blades 48 place the bead bundle 50 in position so that injection against the inner diameter face of the bead will place the bead in tension and prevent kinking of the wires in the bead bundle. As shown in FIG. 2 each of the support blades 48 is positioned at an angle α of 45 degrees to the radius R of the mold assembly 10. In this position of the blades 48 the resulting grooves in the bead apex assembly 18 extend in a direction other than the direction of the ply cords wrapped around the bead apex assembly 18 in a tire built with this assembly so that the cords of the plies will not be pulled into the grooves. The support blades 48 are also tapered to facilitate removal of the bead apex assembly 18 from the lower mold half 12 and upper mold half 14 upon opening of the mold assembly 10.

Figure 5:
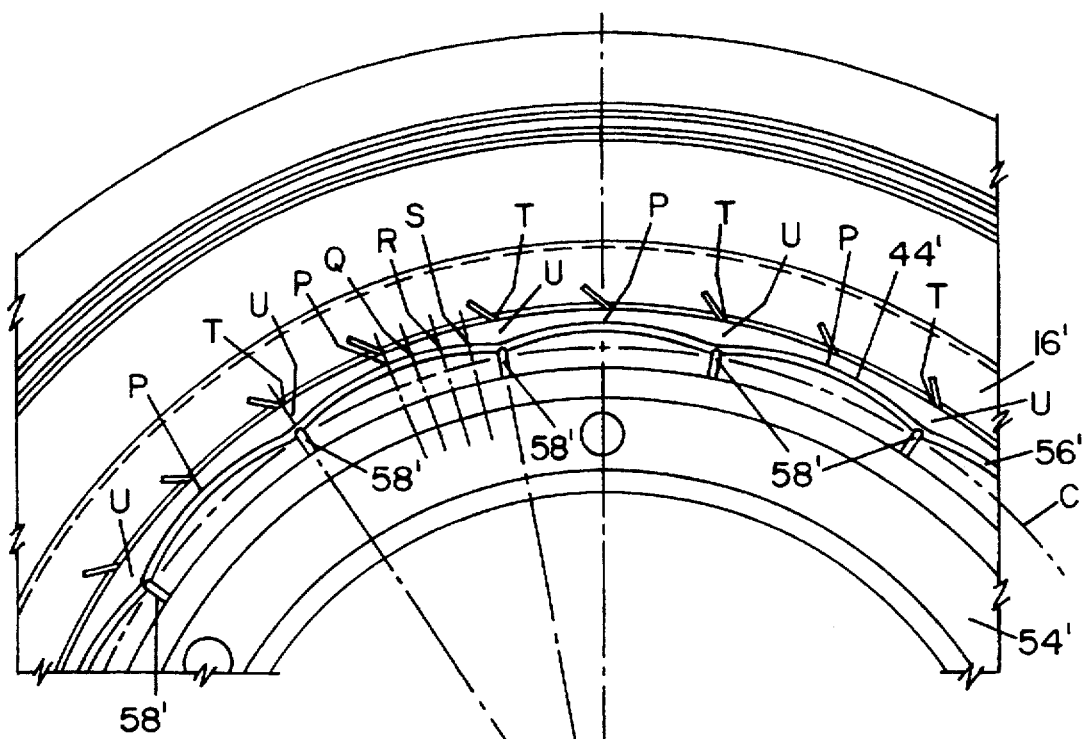
FIG. 5 is a fragmentary plan view like FIG. 2 showing a modified manifold and landing for the lower mold half to provide for an equal drop in pressure from the mold inlets to the mold cavity.

Referring to FIG. 5 a modified lower mold half 54 having a modified manifold 56 is shown. Where the parts are the same as in the assembly 18 shown in FIGS. 1,2,3 and 4 they will be identified with the same number and a prime mark. Runner inlets 58 are at circumferentially spaced positions corresponding to the positions of the nozzles 34 shown in FIG. 1. Each of the inlets 58 is the same radial distance from the edge of the mold cavity 16'. The manifold 56 is inclined from a circular configuration shown by line C to radially outward positions P between the inlets 58. The location of the manifold positions P is half way between the inlets 58 and closer to the mold cavity 16' by a distance sufficient to provide an elastomeric pressure at the mold cavity 16' which is substantially equal to the pressure at the edge of the mold cavity at positions T which are radially outward from inlets 58.

In between the inlets 58 and positions P the manifold positions Q,R, and S are also closer to the mold cavity 16' than the inlets 58 by distances to provide substantially equal elastomeric pressure at the edge of the mold cavity 16'. The radial locations of the manifold positions Q,R, and S can be calculated by determining the pressure drop per inch of elastomeric material passing through the manifold 56 and the pressure drop per inch of material passing through the injection passage 44'. The pressure drop at "T" can be determined by multiplying the distance U between the runner inlets 58 and the edge of the cavity 16' times the pressure drop per inch in the injection passages 44'. This same pressure is then provided at positions corresponding to Q,R, and S by locating the manifold 56 in a radial position relative to the cavity 16' so that the sum of the pressure drop in the manifold 56 and the pressure drop in the injection passage 44' equals the pressure drop at position T. Therefore, by locating the manifold 56 as indicated the injection pressure at all positions around the cavity 16' will be substantially the same and weld lines in the injected tire component such as bead apex assembly 18 will be substantially eliminated.

Figure 6:
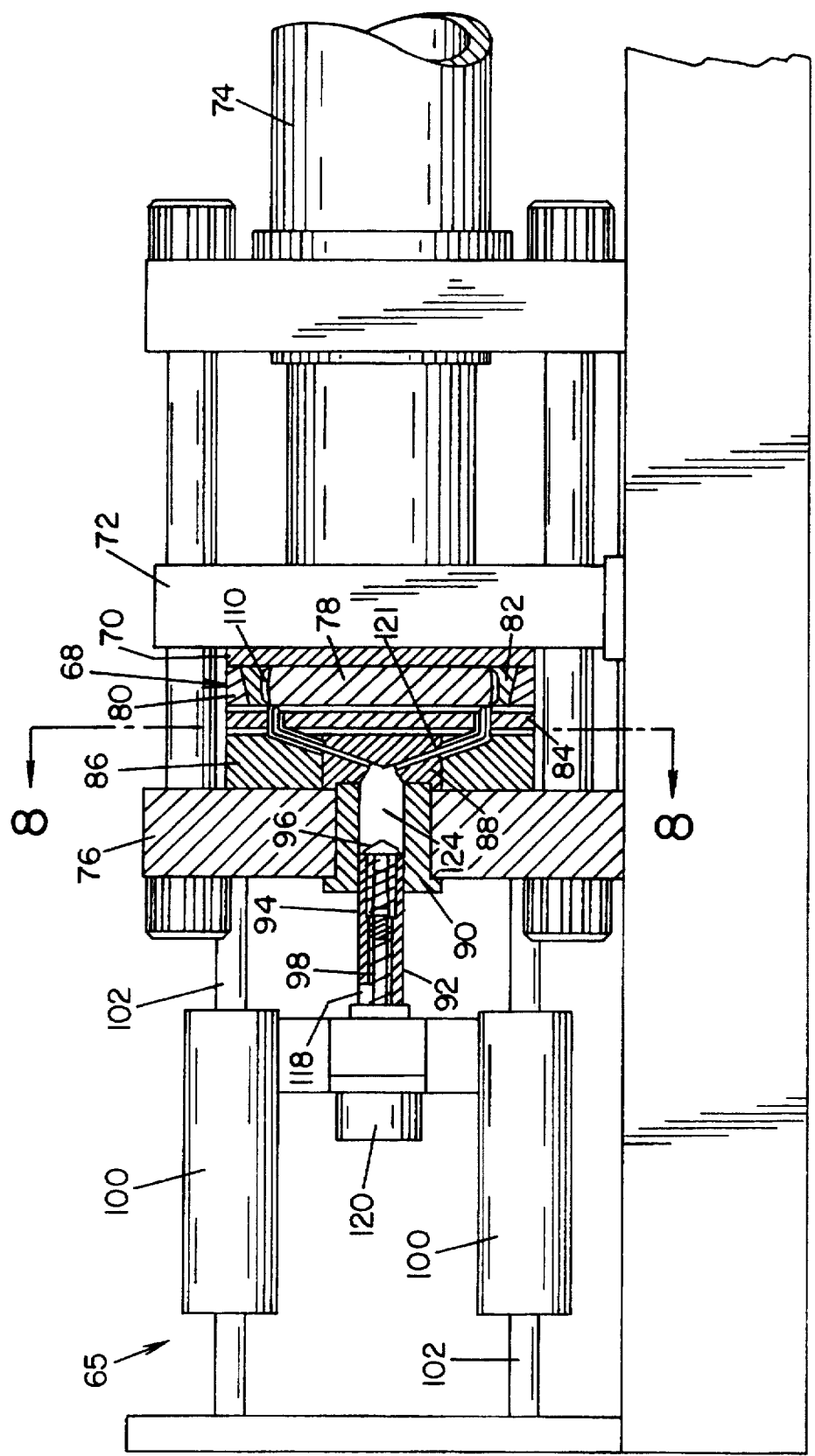
FIG. 6 is a schematic elevation in section of a screw type injection molding apparatus for a tire tread mold shown in the mixing position of the extruder barrel.
Figure 7:
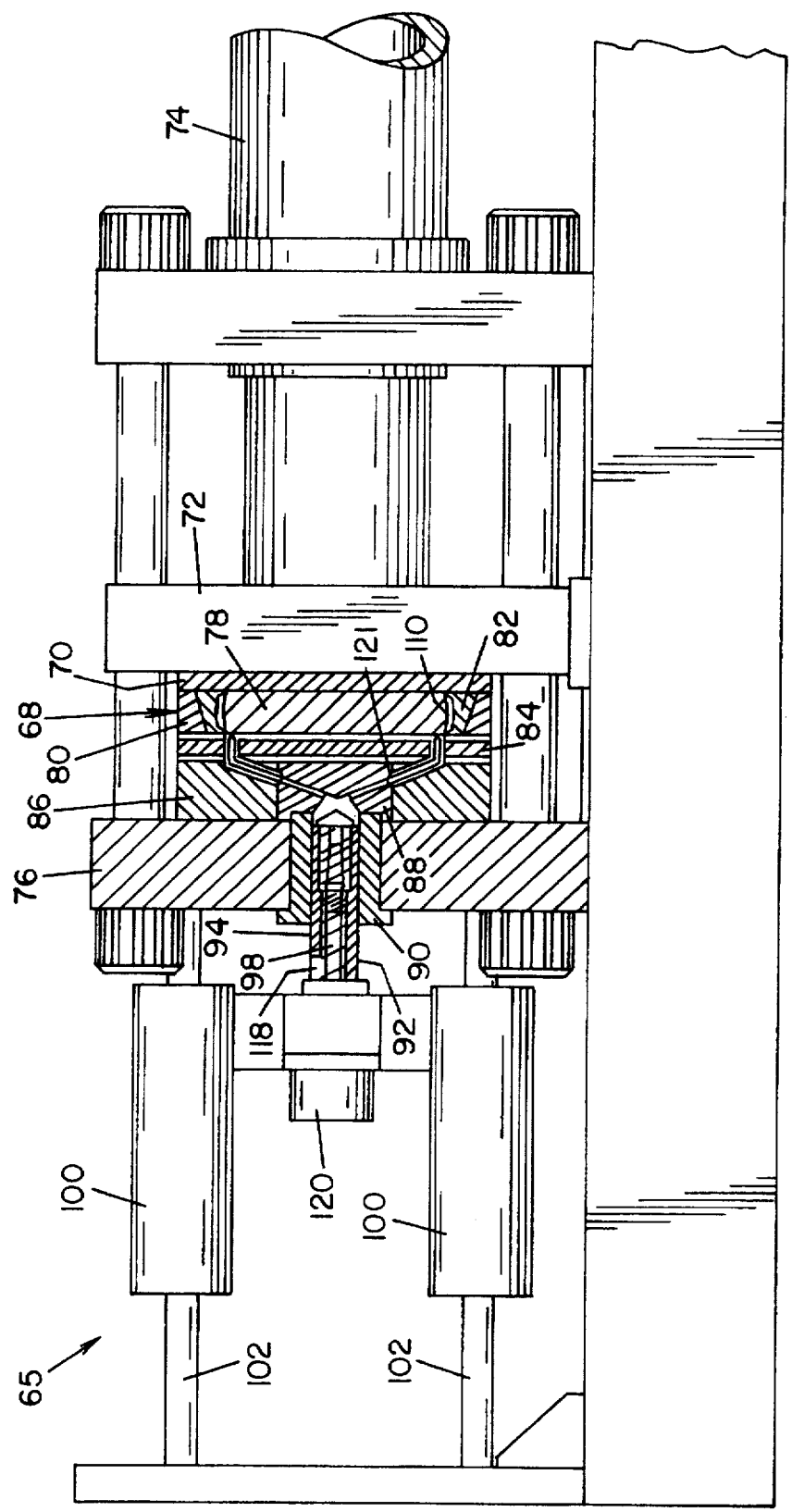
FIG. 7 is a view like FIG. 6 showing the apparatus with the extruder barrel in the charging position.

With reference to FIGS. 6 and 7, a manifold injection molding apparatus 65 for injection molding a tire component of elastomeric material such as a rubber tread is shown in the mixing position (FIG. 6) and injection position (FIG. 7). A segmented tread mold 68 has a moving mold plate 70 mounted on a moving piston plate 72 connected to a mold cylinder 74 for clamping the mold 68 between the mold plate 70 and a fixed press plate 76. The segmented tread mold 68 includes a core 78, a heel block 80, a plurality of radially movable mold segments 82, a sprue plate 84, a cold plate 86 and a distribution block 88.

A nozzle barrel 90 is mounted on the fixed press plate 76 and has an extruder cylinder 92 slidably movable in the barrel between the mixing position shown in FIG. 6 and the injection position shown in FIG. 7. The extruder cylinder 92 is part of an extruder 94 having an extruder screw 98. The extruder 94 is mounted on double acting cylinders 100 containing pistons (not shown) connected to piston rods 102 fastened to the fixed press plate 76 whereby the extruder 94 and extruder cylinder 92 can be moved toward and away from the tread mold 68.

Figure 9:
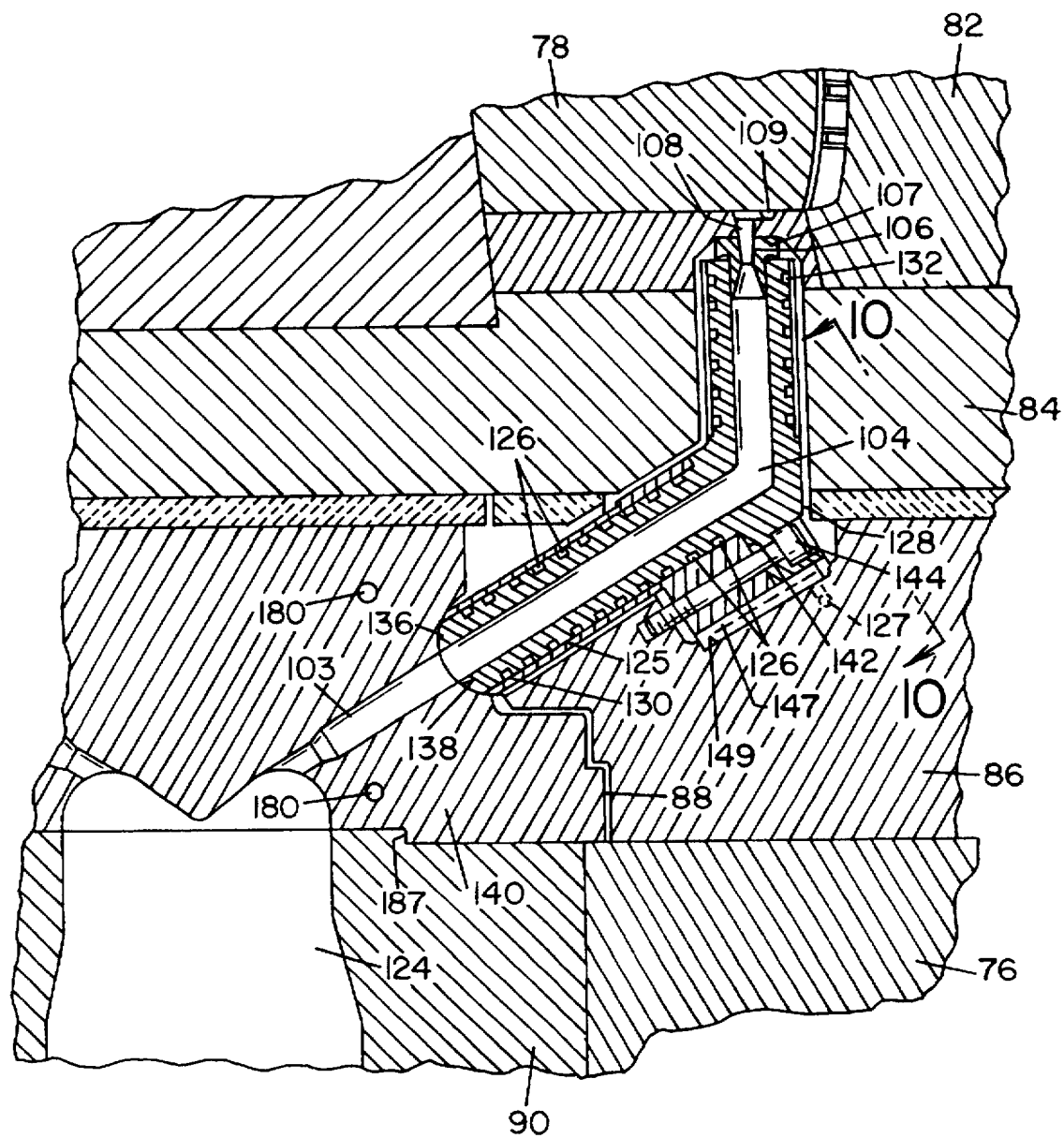
FIG. 9 is a fragmentary cross-section of the nozzle, cold plate assembly, and sprue plate of the apparatus shown in FIGS. 7 and 8 taken along the plane of line 9—9 in FIG. 8 showing one of the tubes with the cooling passages.

As shown more clearly in FIG. 9, circumferentially spaced ports 103 in the distribution block 88 extend from the centrally located cavity 124 to tubes 125 having channels 104 in communication with spring loaded mold nozzles 106 abutting a sprue plate surface 107 and surrounding openings 108 which are in communication with a generally circular manifold 109 in the sprue plate 84.

Figure 11:
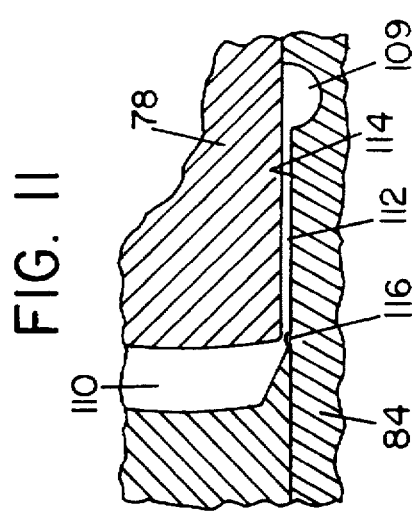
FIG. 11 is a enlarged view in section like FIG. 4 showing the manifold landing and narrow opening at the injection gate for the tread mold shown in FIG. 9.

As shown in FIG. 11 the manifold 109 is in communication with a mold cavity 110 through an injection passage 112 between landing areas 114 and mold core 78. A circular rib 116 may be provided on the landing area 114 to further restrict the flow of elastomeric material through the passage 112.

Referring to FIGS. 6 and 7, a feed opening 118 is provided in the extruder cylinder 92 for feeding elastomeric material into the cylinder and a motor 120 is connected to the screw 98 for rotating the screw and mixing the material. As it is mixed, the material is communicated by the screw 98 to a centrally located cavity 124 in the distribution block 88 as shown in FIG. 6. At the same time the extruder 94 is movable away from the fixed press plate 76 with the injection cylinders 100 to the position shown in FIG. 6. Then hydraulic fluid is communicated to the injection cylinders 100 causing them to move to the position shown in FIG. 7 and communicate the elastomeric material from the cavity 124 to the mold cavity 110.

Figure 10:
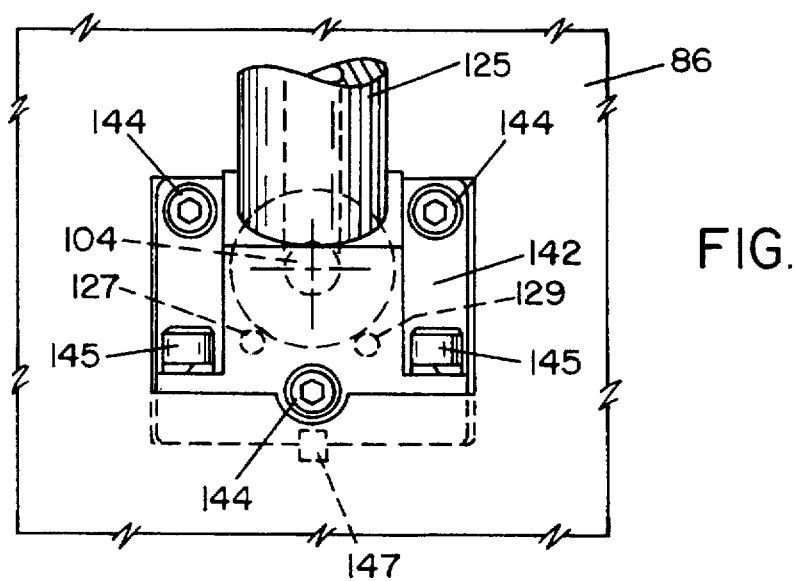
FIG. 10 is an end view of the tube taken along line 11—11 in FIG. 9 with parts being broken away.
Figure 8:
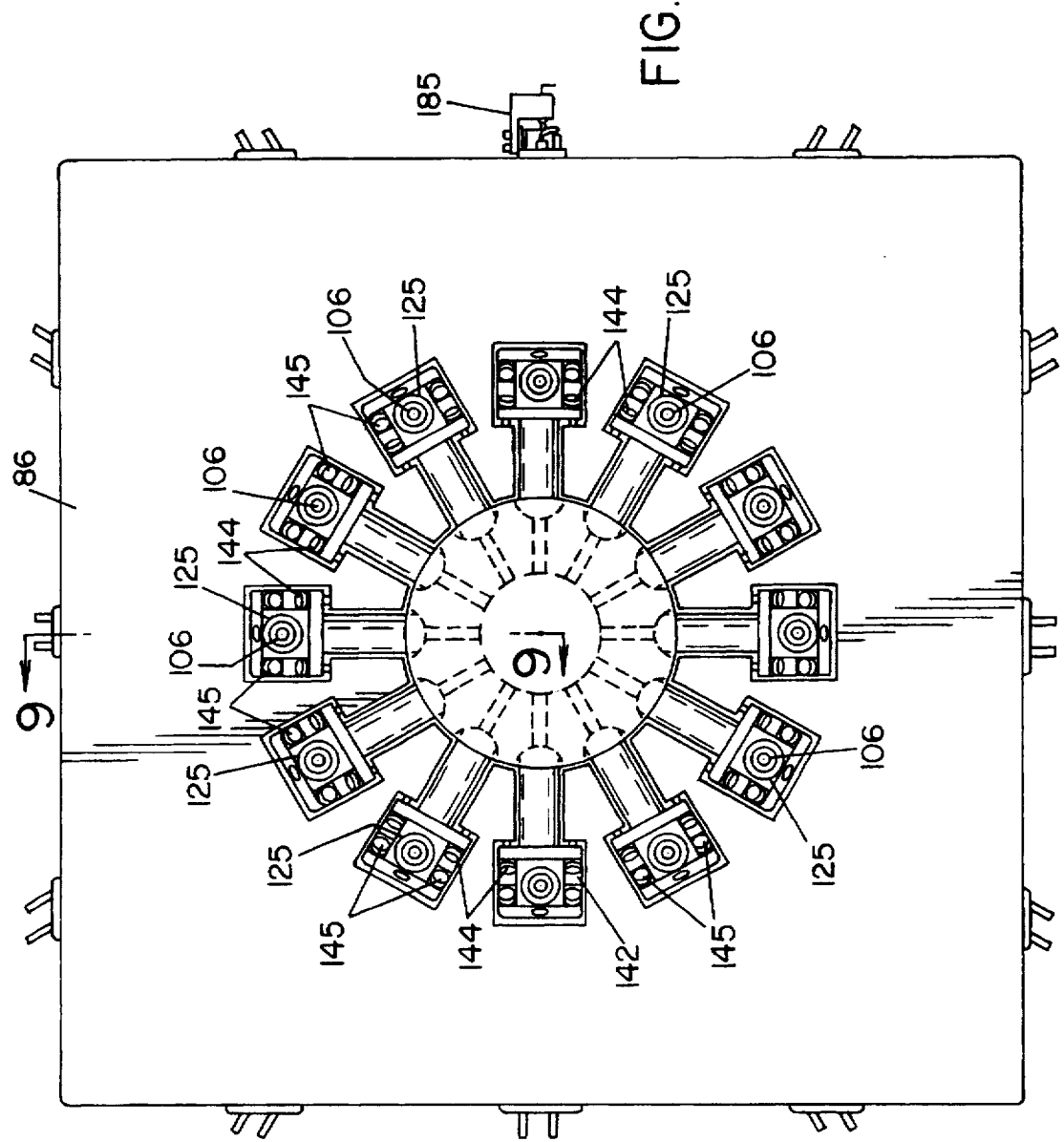
FIG. 8 is a plan view of the distribution plate and cold plate illustrating the cold runner system taken along line 8—8 in FIG. 6.

In FIGS. 8, 9 and 10, the distribution block 88, cold plate assembly 86, sprue plate 84 and tread mold as well as an enlarged view of one of tubes 125 for the channels 104 are shown. FIGS. 9 and 10 also illustrate the configuration of the generally spiral cooling passages 126 disposed adjacent the tubes 125. The passages 126 carry a coolant and extend from an inlet 127 at a first position 128 upstream from the manifold 108 to a second position 130 further upstream of the manifold, back to a third position 132 adjacent the manifold and then back to the first position where the coolant is carried away by an outlet 129. In this manner the elastomeric material being injected through the channels 104 is cooled first at the second position 130 where it enters the channels with the lowest temperature coolant and then as the material passes through the channels the cooling continues with coolant which is warmer and does not cause a drop in material temperature which will adversely affect the curing of the elastomeric material after it enters the mold cavity. In other words, scorching of the material is avoided without causing an undesirable drop in elastomer temperature.

As shown in FIGS. 9 and 10, the channels 104 and cooling passages 126 are each encased in one of the tubes 125 having a spherical end 136 for sealing engagement with a female socket 138 in a distribution block 140. Each tube 125 may have a flange 142 with screws 144 extending through the flange and threaded in the cold plate 86 for urging the spherical end 136 into the female socket 138 and thereby provide a seal. The flange 142 may also be bolted to the cold plate 86 by screws 145 to hold the tube 125 in sealing engagement. As shown in FIG. 9 a key 147 on the under side of the flange 141 is in sliding engagement with a keyway 149 in the cold plate 86 for providing alignment.

The coolant circulated in the cooling passages 126 may be controlled by a separate cooling system including a separate pump and thermostat to provide the most desirable coolant temperature and flow for the elastomer passing through the channels 104. Furthermore, separate cooling systems may be provided for controlling the cooling passages 180 in the distribution block 140 and cooling passages 24 in cold plate 86 so that the temperature of the injected elastomer may be controlled at the different locations to provide high temperatures without scorching for rapid flow of the elastomer.

Figure 12:
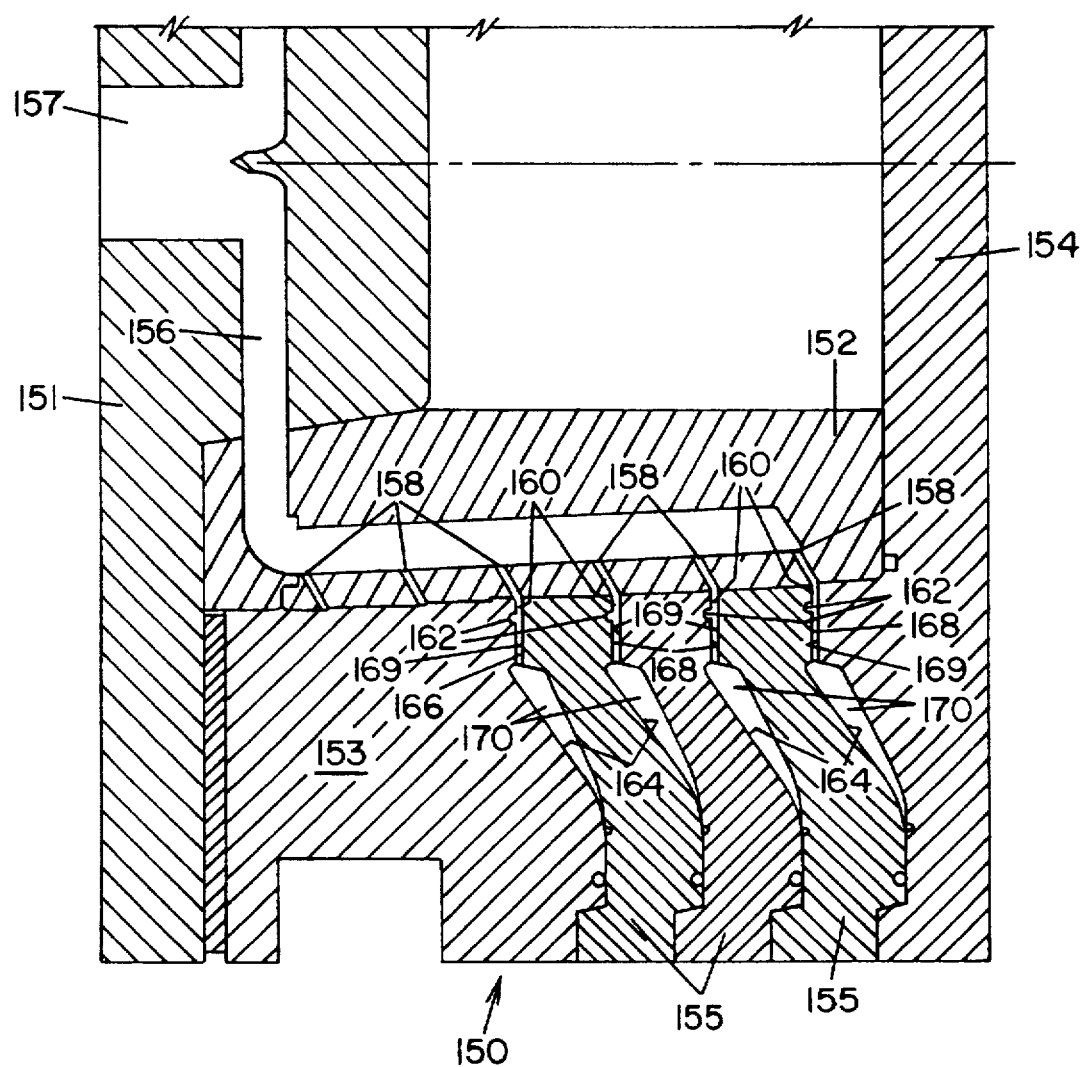
FIG. 12 is a fragmentary sectional view of a plurality of stacked mold plates for simultaneous injection of a plurality of bead apex assemblies utilizing the injection molding apparatus of FIGS. 6 and 7.

Referring to FIG. 12 a stacked mold 150 is shown which has a distribution plate 151 which may be mounted on a fixed press plate 76 of an injection molding apparatus such as apparatus 65 shown in FIGS. 6 and 7. The mold 150 has a tapered generally cylindrical core 152 for supporting a bottom mold plate 153, a top mold plate 154 and intermediate mold plates 155. Circumferentially spaced runners 156 extend from a nozzle chamber 157 to inlet passages 158 in the core 152 which are in alignment with runner inlets 160 in the mold plates 153,154 and 155. As shown in FIG. 11, the runner inlets 160 are connected to a manifold 162 which is connected to a mold cavity 164 by an injection passage 166 defined by a landing area 168 on the respective mold plates 153,154 and 155 spaced from a mating surface 169.

Figure 13:
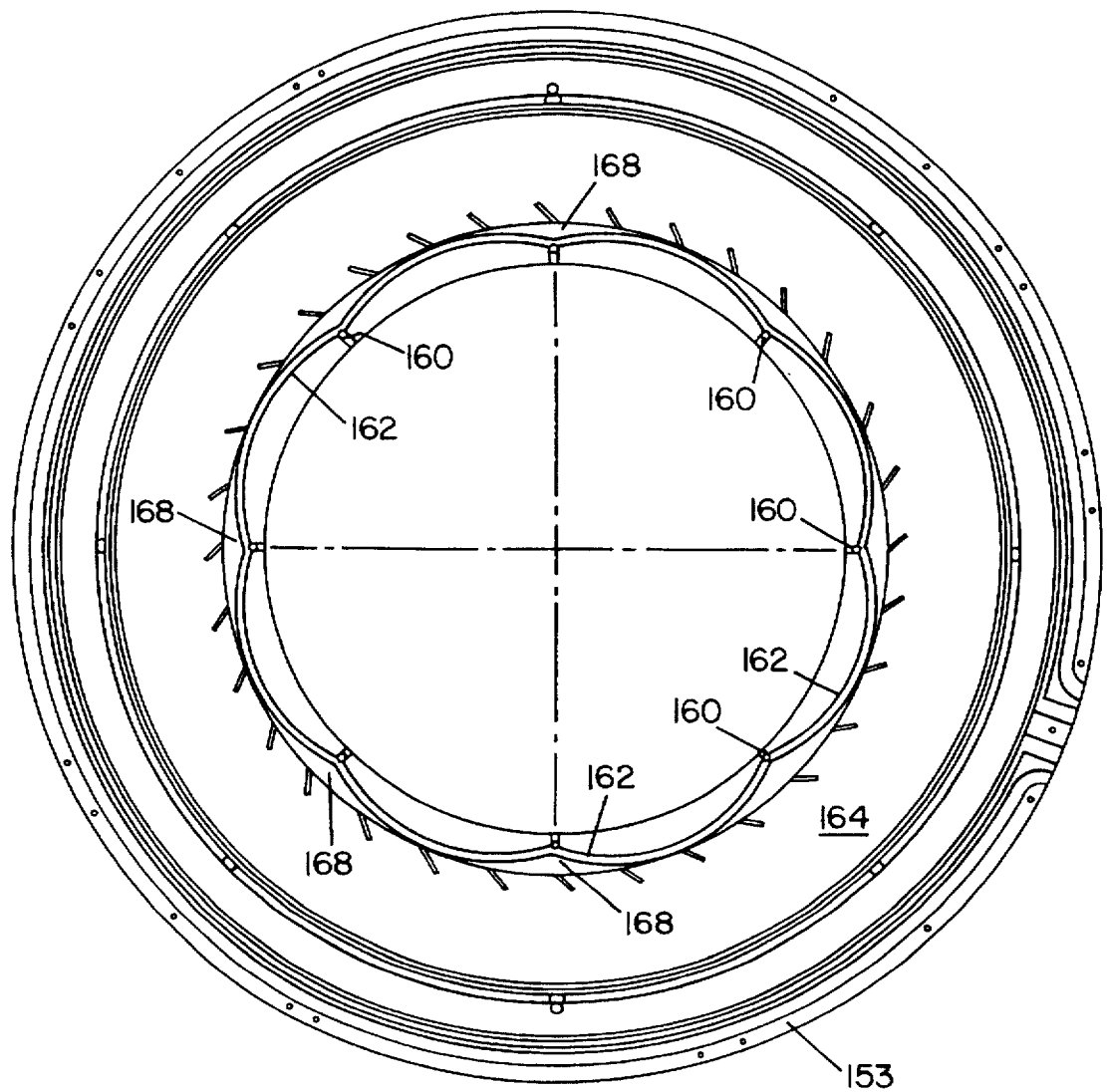
FIG. 13 is a plan view of the bottom mold plate of the assembly shown in FIG. 12 illustrating the manifold and landing.

As shown in FIGS. 12 and 13, the bottom mold plate 153 is fastened to the distribution plate 151 while the intermediate mold plates 155 and top mold plate 154 may be lifted off the core 146 for removal of a molded tire component such as bead apex assembly 170 from the mold cavity 164. The number of molded tire components to be molded at one time can be changed by increasing or decreasing the thickness of the bottom mold plate 153 and adding or decreasing the number of intermediate mold plates 155.

Figure 14:
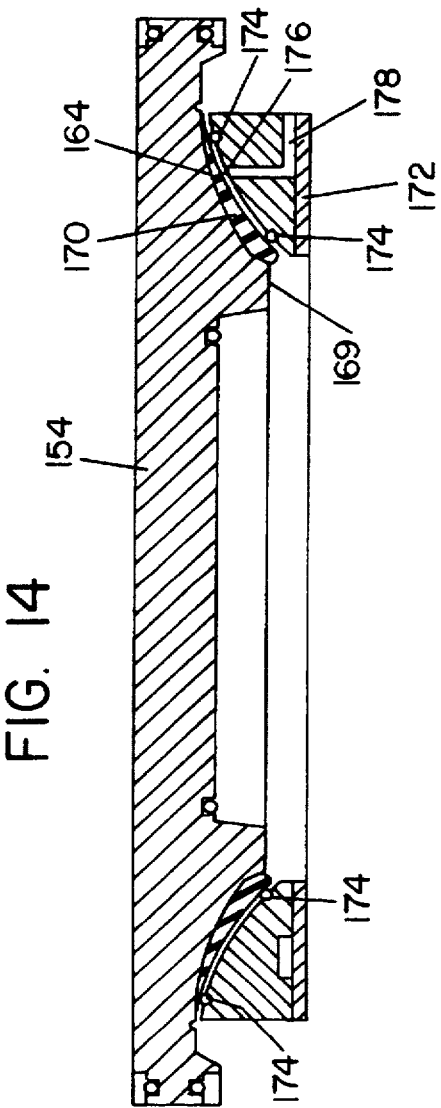
FIG. 14 is a schematic sectional view showing an unloader for the bead apex assembly.

Referring to FIG. 14, the top mold plate 154 is shown after opening of the stacked mold 150 showing the bead apex assembly 170 after injection and still retained in the mold cavity 164. An unloader ring 172 is movable into a position abutting the bead apex assembly 170 and may have sealing rings 174 at the edges for engagement with the surface of the assembly 170. A plurality of circumferentially spaced apart openings 176 in the ring 172 disposed between the sealing rings 174 are in communication with a source of vacuum through passages 178. In operation a vacuum is communicated to the passages 178 for pulling the bead apex assembly 170 out of the mold cavity 164 against the unloader ring 172 without distorting the assembly. The unloader ring 172 is then movable to a position spaced from the top mold plate 154 where the assembly may be stored or used to build a tire. This same unloader ring 172 may be used in conjunction with the intermediate mold plates 155 of the embodiment shown in FIG. 12 or with the upper mold half 14 of the embodiment shown in FIG. 1. In this manner this tire component which is partially vulcanized may be removed from the mold and handled without distortion which is important for fabricating a high precision tire.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. Apparatus for injection molding an elongated component of elastomeric material comprising:
    (a) a mold assembly having a cold plate and a heated mold mounted on said cold plate;
    (b) an injection apparatus for heating, mixing and injecting said elastomeric material into said mold assembly;
    (c) a plurality of runners in said cold plate for communicating said material from said injection apparatus to said heated mold;
    (d) a generally elongated manifold defined by opposing heated surfaces of said mold connected to said runners in said cold-plate;
    (e) an elongated mold cavity adjacent said elongated manifold defined by said opposing heated surfaces of said mold and (f) a landing area between said elongated manifold and said elongated mold cavity defined by said opposing surfaces of said heated mold and having a narrow elongated opening providing for heating and shearing said material as it is injected into said elongated mold cavity to increase the temperature and decrease the curing time of said elastomeric material.

2. Apparatus in accordance with claim 1 wherein said generally elongated manifold is connected to said passages at spaced runner inlet positions along said manifold and said manifold and said landing area have a configuration whereby the sum of the pressure drop in a section of said manifold and the pressure drop in a corresponding section of said landing area is substantially equal at all positions along said elongated mold cavity.

3. Apparatus in accordance with claim 2 wherein said manifold is curved towards said mold cavity between said runner inlet positions whereby said elastomeric material undergoes a smaller pressure drop in said landing area as it is communicated away from said runner inlet positions.

4. The apparatus of claim 1 wherein said elongated component is a circular tire component, and said manifold is circular with said mold cavity positioned radially outward of said manifold.

5. The apparatus of claim 4 wherein said tire component is a tire tread and said cold plate includes cooling passages disposed adjacent said runners with at least one of said passages extending from a first position upstream from said manifold to a second position further upstream from said manifold, back to a third position adjacent said manifold and then to a position adjacent said first position.

6. The apparatus of claim 4 wherein said tire component is a bead and apex assembly and said mold cavity has a plurality of spaced blades embedded in a radially inner surface of said mold for supporting said bead of said assembly during injection of said elastomeric material into said mold cavity.

7. The apparatus of claim 6 wherein said blades are inclined in a direction other than the direction of the cords of the plies wrapped around said bead apex assembly in a tire built with said assembly.

8. The apparatus of claim 7 wherein said blades are tapered to facilitate removal of said bead and apex assembly from said mold assembly.

9. Apparatus for injection molding an elongated component of elastomeric material comprising:
    (a) a mold assembly having a cold plate and a heated mold mounted on said cold plate;
    (b) an injection apparatus for heating, mixing and injecting said elastomeric material into said mold assembly;
    (c) a plurality of runners in said cold plate for communicating said material from said injection apparatus to said heated mold;
    (d) a generally elongated manifold defined by opposing heated surfaces of said mold connected to said runners in said cold-plate;
    (e) an elongated mold cavity adjacent said elongated manifold defined by said opposing heated surfaces of said mold; and
    (f) a landing area between said elongated manifold and said mold cavity defined by said opposing heated surfaces of said heated mold.

10. Apparatus for injection molding simultaneously a plurality of circular tire components of elastomeric material comprising:
    a mold assembly having a cylindrical core;
    a cylindrical bottom mold plate mounted on said cylindrical core;
    a plurality of intermediate mold plates mounted on said bottom mold plate;
    a top mold plate mounted on top of said intermediate mold plates;
    said mold assembly being connected to an injection apparatus for heating, mixing and injecting said elastomeric material into mold cavities defined by opposing faces of said top, intermediate and bottom mold plates, a plurality of runner inlets in said mold plates in communication with circular manifolds defined by opposing faces of said top mold plate, said bottom mold plate and said intermediate mold plates and landing areas between said manifold and said mold cavities defined by opposing faces of said top mold plate, said bottom mold plate and said intermediate mold plates.

11. The apparatus of claim 10 wherein said top mold plate and said intermediate mold plates are moveable away from said bottom mold plate for unloading said circular tire components from said mold assembly.

12. The apparatus of claim 10 wherein said mold is separable into at least two mold plates so that said circular tire component will adhere to one of said mold plates during opening, an unloader ring having a retaining surface movable into position abutting one of said tire components, sealing rings at the edges of said retaining surface, and vacuum means in communication with said retaining surface for holding said one of said tire components on said unloader ring and means for moving said unloader ring with said one of said tire components to an unloading position spaced from said mold assembly.

13. Apparatus for injection molding a circular component of elastomeric material from a source of material under pressure located radially inward of said component comprising:
    (a) a mold assembly having a cold plate and a heated mold with a circular mold cavity mounted on said cold plate;
    (b) a centrally located distribution block having a centrally located cavity for direct communication with said circular mold cavity;
    (c) a plurality of circumferentially spaced tubular members extending between said distribution block and said mold and having channels in communication with said centrally located cavity;

(d) said mold assembly having a plurality of runners in communication with said channels and a circular manifold in said mold; and (e) a landing area passage between said mold cavity and said manifold defined by opposing faces of said mold for communicating said elastomeric material from said manifold to said mold cavity.

14. The apparatus of claim 13 wherein said source of material under pressure is an extruder cylinder and screw assembly with said screw being movable into and out of said centrally located cavity for filling and emptying said cavity and pressure means for moving said screw assembly.

15. The apparatus of claim 14 wherein said pressure means comprises a hydraulic cylinder and piston assembly in communication with a source of fluid under pressure.

16. The apparatus of claim 13 wherein each of said tubular members has a spherical end for seating in a socket in said distribution block and screw means for holding said tubular members against said distribution block.

17. The apparatus of claim 16 wherein said circular component is a tire component and said landing area has a circular rib for restricting the flow of elastomeric material through said landing area passage to increase the temperature and decrease the curing time for said elastomeric material injected into said circular mold cavity.

18. The apparatus of claim 13 wherein said tubular members include cooling passages and at least one of said passages extending from a first position upstream from said manifold to a second position further upstream from said manifold, back to a third position adjacent said manifold and then to a position adjacent said first position.

* * * * *